(No Model.) 2 Sheets—Sheet 1.

J. STEPHENSON.
CAR WHEEL GUARD.

No. 283,298. Patented Aug. 14, 1883.

Attest:
Josephine Campbell.
Court. A. Cooper.

Inventor:
John Stephenson
By
Charles E. Foster
Atty (No Model.) 2 Sheets—Sheet 2.

J. STEPHENSON.
CAR WHEEL GUARD.

No. 283,298. Patented Aug. 14, 1883.

Attest:
Josephine Campbell
Comt. A. Cooper

Inventor:
John Stephenson
By Charles E. Foster
atty

UNITED STATES PATENT OFFICE.

JOHN STEPHENSON, OF NEW YORK, N. Y.

CAR-WHEEL GUARD.

SPECIFICATION forming part of Letters Patent No. 283,298, dated August 14, 1883.

Application filed February 23, 1883. (No model.) Patented in England June 15, 1877.

*To all whom it may concern:*

Be it known that I, JOHN STEPHENSON, of New York, in the county of New York and State of New York, have invented certain new and useful Improvements in Car-Wheel Guards; and I do hereby declare that the following is a full, clear, and exact description thereof, which will enable others skilled in the art to which it appertains to make and use the same, reference being had to the accompanying drawings, and to letters of reference marked thereon, which form a part of this specification, in which—

Figure 1:
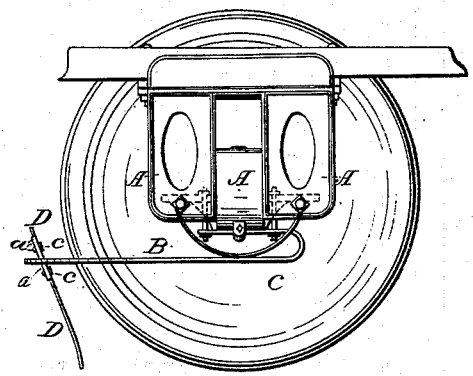
Figure 4:
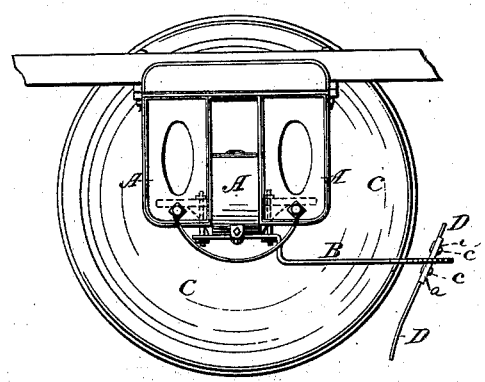
Figure 2:
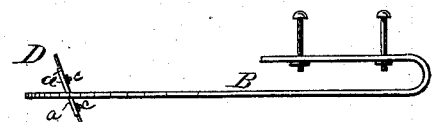
Figure 5:
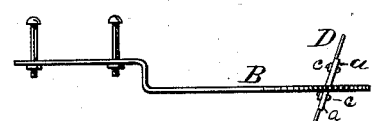
Figure 3:
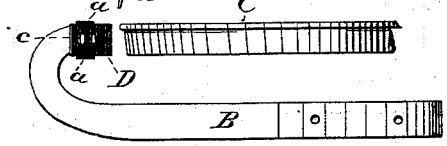
Figure 6:
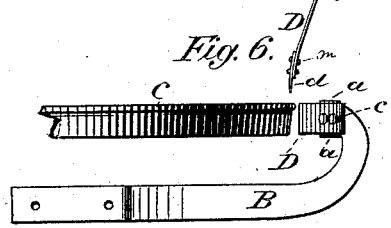
Figure 7:
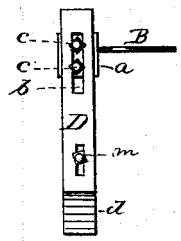
Figure 8:
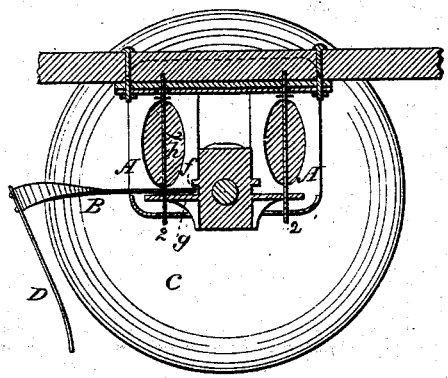
Figure 11:
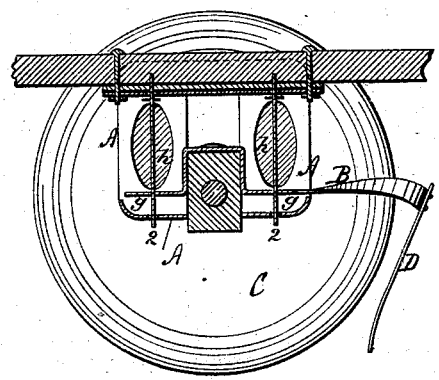
Figure 9:
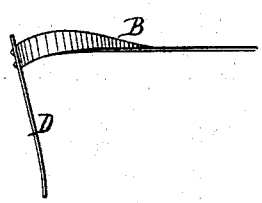
Figure 12:
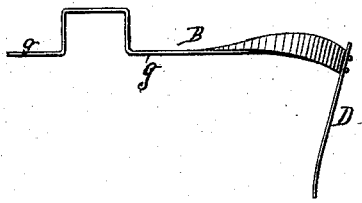
Figure 10:
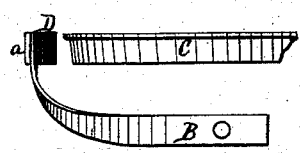
Figure 13:
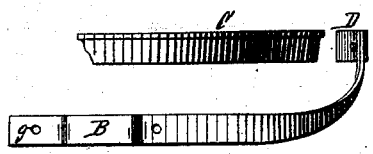

Figure 1 represents a side elevation of a car-wheel and axle-box to which my improvement has been applied; Fig. 2, a side elevation of the guard detached from the axle-box; and Fig. 3, a top view of the guard as related to the wheel, a portion of which is broken off. Fig. 4 represents a side elevation of a car-wheel and axle-box to which my improvement has been applied in a modified form; Fig. 5, a side elevation of its guard detached from the axle-box; and Fig. 6, a top view of the guard as related to the wheel, a portion of the latter being broken off. Fig. 7 represents a front view of the guard-plate and scraper as applied to its supporting-arm. Fig. 8 represents a side elevation of a car-wheel and axle-box to which my improvement is applied in another modified form; Fig. 9, a side elevation of the modified guard detached, and Fig. 10 a plan of the same as related to the car-wheel. Figs. 11, 12, and 13 represent corresponding views to those shown in Figs. 8, 9, and 10, of another modification of my improvement, illustrative of another mode of constructing and applying the guard to the axle-box, and its relation to the car-wheel.

In running street-cars a lamentable ill connected with their use in crowded streets is the loss of life and mutilation of limbs, which not unfrequently result to persons who accidentally fall before the wheels while the cars are in motion. Many attempts have heretofore been made to surround the wheels or otherwise shield them from contact; but no devices for that purpose have hitherto been generally adopted, because in many instances such devices have been attached to the car-body, and therefore changing their distance with every variation of the load, while in other cases the construction has proved objectionable and inefficient. I have devised means whereby guards may be placed before the wheels, which will not be subject to control by the car-body, but which, on the contrary, will remain in proper position as adjusted, and always be ready to throw from the wheels any obstacle lying in their path, and the construction of which is such as to insure their practical application and efficient operation.

In applying my improvement no essential variation need be made in the cars as ordinarily constructed, though I prefer, for this and other reasons, that the brake-shoe should operate on the sides of the wheels toward the center of the car to permit the guards to be near the wheels and in the most effective position.

To enable others skilled in the art to make and construct my improvement, I will now describe it in detail, omitting a particular description of such parts of a car and its running-gear as is unnecessary to a full understanding of this improvement. Here premising that as there are many modified forms in which it may be applied I will refer particularly to but a few of them, commencing with that form which I deem the preferable one.

On the under side of the axle-box A, and nearly in a central position, (see Figs. 1 and 4,) I locate the arm B, (which is best when made of steel three inches wide and about one-fourth of an inch thick,) so as to cross the under side of the box in a horizontal plane at right angles to the axle, and there secure its inner end to the box by bolts or clips or other known and suitable means. From this location the arm passes forward of and parallel with the face of the wheel C and makes a curve suitable for bringing the farther end in position to place the guard D immediately in front of the wheel. The arm B terminates at its outer end in a palm, *a*, for holding the guard D. For adjusting the guard vertically, a slot, *b*, is made either in the guard or the palm, or both, through which fastening-bolts *c* pass.

As it may at times be desirable that the lower end of the guard should scrape the rail, a scraper, d, made of hardened steel, may be bolted to the lower end of the guard D by means of a slot or bolts, m, (see Figs. 2 and 5,) so as to be easily adjusted, secured, and renewed.

The wheels of a street-car are usually about three inches broad, including tread and flange. I therefore make the guard D of the same width—i e., three inches, and of steel, like the arm B. The guard is placed before the wheel and nearly vertical, its lower end being near the rail, and its upper end connected with the arm B by bolts c, as before described.

Some of the other methods of attaching the supporting-arm or its equivalent to the axle-box are as follows: In one modification (see Figs. 8, 9, and 10) the shoulder end of the arm B is indented into a socket, f, in the axle-box (see Fig. 8) and rests on the bracket g, the arm B intervening between the bracket and the spring h, the pintle-bolt 2 passing through both arm B and bracket g. In another modification (see Figs. 11, 12, and 13) the arm B, at its shoulder, is bent over the box, like a yoke, ⌐⌐, the ends forming brackets g or rests for the springs h, and one end elongated to form the arm B. In this case, like the modification shown in Fig. 8, the pintle-pins 2 pass through the springs h and bracket portions g g of the arm, and thence through the under side of the shell of the axle-box. In other modifications the arm or bar may be secured to the top of the box, or to its front or rear, or either of its sides, but its junction or mode of attachment with the box is not material, so long as it is attached to the latter and is independent of the motions of the car-body, and extends sufficiently far to hold a guard immediately in front of the wheel, of any form or design which will remove from the line of the wheel any obstacle, or which will prevent the wheel from passing over any person or thing lying in its way. Moreover, a broom may be applied to the arm B as a substitute for the guard and scraper as a means of cleaning the rail.

Having described my invention, what I claim as new, and desire to secure by Letters Patent, is—

1. The combination, with an axle-box, of an arm rigidly attached thereto and extending past the side of and bent before the wheel, and a guard rigidly secured to said arm and covering the lower face of the wheel, substantially as described.

2. A safety-guard for tram-cars, consisting of a rigid arm adapted to be secured directly to the box at one end, bent at the other to a position in front of the wheel, and having attached to the bent end a narrow flexible vertical plate, constituting a guard extending from the arm to the rail in front of the lower face of the wheel, substantially as set forth.

3. A tram-car with an axle-box having an arm, with a palm, a, for holding firmly a vertical adjustable rigid guard before the wheel.

4. A tram-car with an axle-box having attached thereto an arm holding before the wheel a vertical rigid guard, the lower end of which is provided with an adjustable scraper which may contact with the surface of the rail.

In testimony that I claim the foregoing as my own I affix my signature in presence of two witnesses.

JOHN STEPHENSON.

Witnesses:
WM. J. WALKER,
STUART A. STEPHENSON.